Patented Sept. 21, 1943

2,329,700

UNITED STATES PATENT OFFICE 2,329,700

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 20, 1941,
Serial No. 415,763

6 Claims. (Cl. 252—344)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in our process consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologs thereof. Coal tar bases represent mixtures of suitable heterocyclic materials which may be used as such, or after suitable purification, without separation into the individual components.

Specifically, then, the compounds herein contemplated as demulsifiers, consist of the quaternary nitrogen products obtained by reacting one mole of hydroxy compounds of the formula:

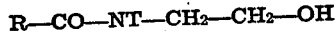

R—CO—NT—CH₂—CH₂—OH in which T is a member of the class consisting of hydroxyethyl radicals, alkyl radicals, aryl radicals, aralkyl radicals, and alicyclic radicals having not more than 22 carbon atoms; RCO denotes an acyl radical derived from a detergent-forming monocarboxy acid, with a heterocyclic compound of the pyridine series selected from the group consisting of pyridine, quinoline, isoquinoline, and C-methyl homologs thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by oxidation of wax, paraffin, etc. Such acids may have as many as 32 carbon atoms. For instance, see U. S. Patent No. 2,242,837, dated May 20, 1941, to Shields.

As to a description of a somewhat analogous type of compound, see U. S. Patent No. 2,242,211, dated May 20, 1941, to Haack.

See also our co-pending application for patent Serial No. 401,375, filed July 7, 1941, which subsequently matured as U. S. Patent No. 2,273,181, dated February 17, 1942, to De Groote and Keiser.

The manufacture of substituted amides, or rather, substituted hydroxylated amides suitable for reaction with pyridine hydrochloride or the like, is well known. For instance, a selected high molal monocarboxy acid can be reacted with diethanolamine, ethyl ethanolamine, propyl ethanolamine, octadecyl ethanolamine, or the like. Similarly, one may employ benzyl ethanolamine, cyclohexyl ethanolamine, phenylethanolamine, or similar amines in which the high molal acyl radical is derived from fatty acids or wax acids having as many at 22 carbon atoms.

Other procedures may be employed: for example, an amide such as oleoamide, ricinoleoamide, stearamide, or the like, may be treated with two moles of ethylene oxide to give the bis(hydroxyethyl)amide. Similarly, an amide may be derived from a non-hydroxylated primary amine, such as, for example, amylamine, aniline, cyclohexylamine, benzylamine, decylamine, or various normal primary amines containing 12-18 carbon atoms, and derived from various fatty acids. Such substituted amides can then be treated with a mole of ethylene oxide, so as to yield the hydroxyethyl derivative. As to the preparation of hydroxylated amides, see also U. S. Patent No. 2,106,241, dated January 25, 1938, to De Groote.

Although any of the high molal monocarboxy acids can be converted into the substituted hydroxy ethyl amides readily by reaction with monoethanolamine, or by other conventional procedure, for instance, reaction of the amide with one mole of ethylene oxide, it is our preference to employ hydroxyethyl amides derived from the higher fatty acids, rather than from petroleum acids, rosin acids, and the like. We have found that by far the most effective demulsifying agents are obtained from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, corn oil, etc. Our preferred demulsifier is obtained from unsaturated fatty acids, and more especially, unsaturated fatty acids containing a hydroxyl radical, or unsaturated fatty acids which have been subjected to an oxidation or oxyalkylation step, such as oxyethylation.

In view of what has been said, and particularly by reference to the aforementioned Haack patent, it will be noted that compounds of the type herein contemplated as demulsifiers, may be indicated by the following formula:

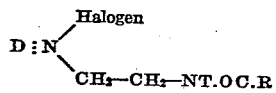

in which T is a member of the class consisting of alkyl radicals, aryl radicals, aralkyl radicals, and alicyclic radicals having not more than 22 carbon atoms; the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine; but iodine may be employed except for its excessive cost. More correctly, D:N is contemplated as a radical, rather than a compound.

Compositions or compounds of the kind intended to be used as the demulsifying agent in our process, may be exemplified by the following examples:

*Example 1*

570 grams of a fatty acid diethanolamide, obtained by reaction of split cocoanut oil (containing all the natural acids, beginning with the capric up to stearic, and some oleic), with diethanolamine, 330 g. hydrochloride of a fraction of pyridine bases (50% distilling up to 140° C., 90% distilling up to 160° completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained may be further worked up to form a 10% water solution.

When working at 150-160°, the reaction is more rapid.

Furthermore, pure pyridine may be used instead of a mixture of pyridine bases. (Compare with Example 2 of the aforementioned Haack Patent No. 2,242,211.)

*Example 2*

Bis(hydroxyethyl) ricinoleoamide derived by reaction between ricinoleic acid and diethanolamine, is substituted for the amide employed in Example 1, preceding.

*Example 3*

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl number | 168.0 to 220.0 |
| Percent unsaponifiable matter | 1.1 |
| Percent nitrogen | 0.0 |
| Percent $SO_3$ | 0.0 |
| Percent ash | Trace | is converted into the di(hydroxyethyl)amide by reaction with diethanolamine. Such amide is substituted for the amide employed in Example 1, preceding.

*Example 4*

One pound mole of castor oil is treated with three pound moles of ethylene oxide in the presence of one-half of 1% of sodium ricinoleate as a catalyst at a temperature of 100-200° C. at a gauge pressure of 100 lbs. and less than 300 lbs., so as to produce an oxyethylated triricinolein. Such oxyethylated triricinolein is reacted with diethanolamine to give a suitable amide which is employed instead of the amide described in Example 1, preceding.

*Example 5*

Phenylstearic acid is prepared in any suitable manner, as, for example, in the manner described in U. S. Patent No. 2,081,075, dated May 18, 1937, to Vobach. This acid is converted into bis(hydroxyethyl)phenylstearamide, by reaction with diethanolamine; and such amide is employed in the manner described in Example 1, preceding.

*Example 6*

Ethyl ethanolamine is substituted for diethanolamine in the preceding 5 examples.

*Example 7*

Benzyl ethanolamine is substituted for diethanolamine in Examples 1-5, preceding.

*Example 8*

Cyclohexyl ethanolamine is substituted for diethanolamine in Examples 1-5, preceding.

*Example 9*

High molal primary amines derived from fatty acids having 16-22 carbon atoms, are treated with one mole of ethylene oxide and such ethanolamine substituted for diethanolamine in Examples 1-5, preceding.

Example 10

Phenylethanolamine is substituted for ethanolamine or diethanolamine in previous examples, so as to yield an amide having both a phenyl group and a hydroxyethyl group directly attached to the amino nitrogen atom.

The manufacture of the above compounds is usually conducted with an excess of the pyridinium base halide, such as the hydrochloride, or hydrobromide, and usually in the presence of a significant amount of the free pyridinium base itself. In many instances, however, there is no need to use an excess of the pyridinium base halide, and, in fact, no need to have present any of the free pyridinium base itself, or, at the most, only a trace of the free base.

As is obvious, other monovalent anions may replace the halogen and serve as a functional equivalent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

Attention is directed to our co-pending application for patent, Serial No. 401,375, filed July 7, 1941, which subsequently matured as U. S. Patent No. 2,273,181, dated February 17, 1942, to De Groote and Keiser. Said copending application contemplates resolution of petroleum emulsions of the water-in-oil type by means of demulsifiers of the following formula type:

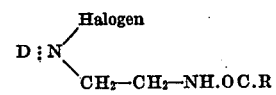

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine; but iodine may be employed except for its excessive cost. More correctly, D:N is contemplated as a radical, rather than a compound.

Attention is also directed to our co-pending applications, filed the same date as the instant application, and bearing the following serial numbers: 415,764, 415,765, and 415,766.

Having thus described our invention, what we claim as new and desire to secure by Letters Patent is:

1. A process for breaking petroleum emulsions of the water-in-oil type, which consists in subjecting the emulsion to the action of a demulsifier comprising a chemical compound of the following formula type:

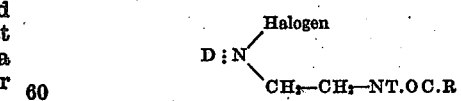

in which T is a member of the class consisting of hydroxyethyl radicals, alkyl radicals, aryl radicals, aralkyl radicals, and alicyclic radicals having not more than 22 carbon atoms; the acyl radical RCO is derived from a monocarboxy detergent-forming acid having at least 8 and not more than 32 carbon atoms; and D:N represents a radical of a heterocyclic compound of the pyridine series consisting of pyridine, quinoline, isoquinoline, and C-methyl homologs thereof.

2. A process of breaking petroleum emulsions of the water-in-oil type, which consists in subjecting the emulsion to the action of a demulsifier comprising a chemical compound of the following formula type:

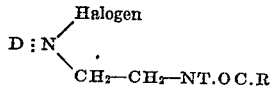

in which T is a member of the class consisting of hydroxyethyl radicals, alkyl radicals, aryl radicals, aralkyl radicals, and alicyclic radicals having not more than 22 carbon atoms; the acyl radical RCO is derived from a higher fatty acid having at least 8 and not more than 32 carbon atoms; and D:N represents a radical of a heterocyclic compound of the pyridine series consisting of pyridine, quinoline, isoquinoline, and C-methyl homologs thereof.

3. A process for breaking petroleum emulsions of the water-in-oil type, which consists in subjecting the emulsion to the action of a demulsifier comprising a chemical compound of the following formula type:

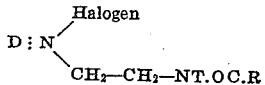

in which T is a member of the class consisting of hydroxyethyl radicals, alkyl radicals, aryl radicals, aralkyl radicals, and alicyclic radicals having not more than 22 carbon atoms; the acyl radical RCO is derived from a higher unsaturated fatty acid having at least 8 and not more than 32 carbon atoms; and D:N represents a radical of a heterocyclic compound of the pyridine series consisting of pyridine, quinoline, isoquinoline, and C-methyl homologs thereof.

4. A process for breaking petroleum emulsions of the water-in-oil type, which consists in subjecting the emulsion to the action of a demulsifier comprising a chemical compound of the following formula type:

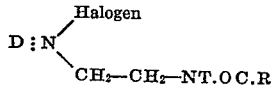

in which T is a member of the class consisting of hydroxyethyl radicals, alkyl radicals, aryl radicals, aralkyl radicals, and alicyclic radicals having not more than 22 carbon atoms; and acyl radical RCO is a ricinoleyl radical; and D:N represents a radical of a heterocyclic compound of the pyridine series consisting of pyridine, quinoline, isoquinoline, and C-methyl homologs thereof.

5. A process for breaking petroleum emulsions of the water-in-oil type, which consists in subjecting the emulsion to the action of a demulsifier comprising a chemical compound of the following formula type:

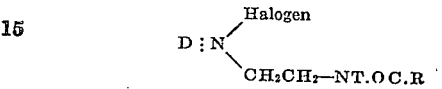

in which T is a member of the class consisting of hydroxyethyl radicals, alkyl radicals, aryl radicals, aralkyl radicals, and alicyclic radicals having not more than 22 carbon atoms; and acyl radical RCO is an oleyl radical; and D:N represents a radical of a heterocyclic compound of the pyridine series consisting of pyridine, quinoline, isoquinoline, and C-methyl homologs thereof.

6. A process for breaking petroleum emulsions of the water-in-oil type, which consists in subjecting the emulsion to the action of a demulsifier comprising a chemical compound of the following formula type:

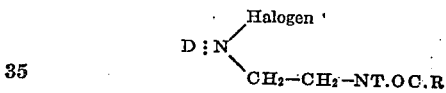

in which T is a member of the class consisting of hydroxyethyl radicals, alkyl radicals, aryl radicals, aralkyl radicals, and alicyclic radicals having not more than 22 carbon atoms; and acyl radical RCO is a linoleyl radical; and D:N represents a radical of a heterocyclic compound of the pyridine series consisting of pyridine, quinoline, isoquinoline and C-methyl homologs thereof.

MELVIN DE GROOTE.
BERNHARD KEISER.